United States Patent
Hikida et al.

(10) Patent No.: US 6,549,195 B2
(45) Date of Patent: Apr. 15, 2003

(54) RESISTANCE-FILM TYPE TOUCH PANEL FOR USE IN A LIQUID CRYSTAL DISPLAY DEVICE AND LIQUID CRYSTAL DISPLAY DEVICE EQUIPPED WITH THE SAME

(75) Inventors: Toshihiko Hikida, Settsu (JP); Sadao Fujii, Kobe (JP)

(73) Assignee: Kaneka Corporation, Osaka (JP)

( * ) Notice: Subject to any disclaimer, the term of this patent is extended or adjusted under 35 U.S.C. 154(b) by 80 days.

(21) Appl. No.: 09/732,447

(22) Filed: Dec. 6, 2000

(65) Prior Publication Data

US 2001/0000961 A1 May 10, 2001

Related U.S. Application Data

(63) Continuation of application No. PCT/JP99/03024, filed on Jun. 7, 1999.

(30) Foreign Application Priority Data

Jun. 8, 1998 (JP) .......................................... 10-158955

(51) Int. Cl.[7] ................................................ G09G 5/00
(52) U.S. Cl. .................... 345/173; 345/174; 345/175
(58) Field of Search ............................... 345/173, 175, 345/174; 349/162, 12

(56) References Cited

U.S. PATENT DOCUMENTS

| | | | | |
|---|---|---|---|---|
| 4,527,862 A | * | 7/1985 | Arakawa | 350/334 |
| 4,754,188 A | * | 6/1988 | Watanabe et al. | 313/402 |
| 5,852,487 A | * | 12/1998 | Fujimori et al. | 349/162 |
| 5,867,151 A | * | 2/1999 | Nakai | 345/173 |
| 6,291,035 B1 | * | 9/2001 | Verrall et al. | 428/1.3 |

FOREIGN PATENT DOCUMENTS

| | | |
|---|---|---|
| JP | 1-203476 | 8/1989 |
| JP | 2-233720 | 9/1990 |
| JP | 3-121523 | 5/1991 |
| JP | 5-157911 | 6/1993 |
| JP | 6-3524 | 1/1994 |
| JP | 6-122852 | 5/1994 |
| JP | 6-240208 | 8/1994 |
| JP | 8-166849 | 6/1996 |
| JP | 9-24571 | 1/1997 |
| JP | 9-265351 | 10/1997 |
| JP | 10-48625 | 2/1998 |
| WO | WO95/23353 | 8/1995 |

\* cited by examiner

*Primary Examiner*—Dennis-Doon Chow
*Assistant Examiner*—Alecia D. Nelson
(74) *Attorney, Agent, or Firm*—Christensen O'Connor Johnson Kindness PLLC

(57) ABSTRACT

The touch panel for use in a liquid crystal display device has a rigid electrode plate composed of a rigid transparent substrate provided with a transparent conductive layer on its upper surface, and a flexible electrode plate composed of a transparent and flexible substrate provided with a transparent conductive layer on its lower surface. On the upper surface of the flexible electrode plate, a polarizer plate is fixed. The flexible transparent substrate includes a transparent film of a transparent amorphous plastic material having a glass transition temperature of 100° C. or higher, and the transparent film has a relative optical elasticity coefficient Cr value of 0.2 to 0.8 defined by the formula: Cr=C/Cpc where C represents an optical elasticity coefficient of the transparent film and Cpc represents an optical elasticity coefficient of a polycarbonate film derived from bisphenol A.

13 Claims, 1 Drawing Sheet

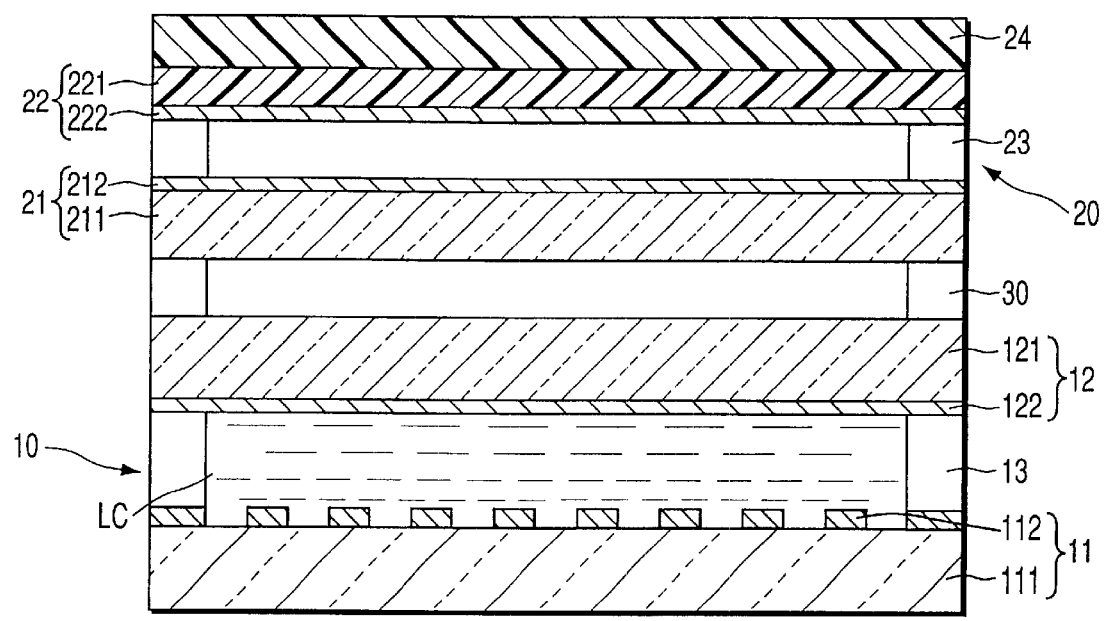
FIGURE

RESISTANCE-FILM TYPE TOUCH PANEL FOR USE IN A LIQUID CRYSTAL DISPLAY DEVICE AND LIQUID CRYSTAL DISPLAY DEVICE EQUIPPED WITH THE SAME

CROSS REFERENCE TO RELATED APPLICATIONS

This is a Continuation Application of PCT Application No. PCT/JP99/03024, filed Jun. 7, 1999, which was not published under PCT Article 21(2) in English.

This application is based upon and claims the benefit of priority from the prior Japanese Patent Application No. 10-158955, filed Jun. 8, 1998, the entire contents of which are incorporated herein by reference.

BACKGROUND OF THE INVENTION

The present invention relates to a resistance-film type touch panel for used in a liquid crystal display device, and a liquid crystal display device equipped with the same, and more specifically, to a touch panel incorporated between an observation-side polarizer plate and a liquid crystal cell of a liquid crystals display device, and a touch panel-integrated liquid crystal display device.

These days, the liquid crystal display element is drawing an attention as an image display element, and applied to a portable electronic notebook, or other information terminals.

As an input device for these portable information terminals, a resistance-film type touch panel is employed which is placed on a liquid crystal cell via a spacer.

The resistance-film type touch panel has a structure in which a movable (flexible) transparent electrode plate composed of a flexible transparent substrate provided with a transparent electrode layer, and a fixed (rigid) transparent electrode composed of a rigid transparent substrate also provided with a transparent electrode layer are arranged space apart from each other via a spacer such that their transparent electrode layers face each other. The flexible electrode plate yields by pressing applied from the flexible electrode plate with a pen or a finger and its transparent electrode layer is brought into point contact with the transparent electrode layer of the rigid electrode plate, thus the two electrodes are electrically connected with each other, thereby detecting the contact position (input position).

For the substrate of the flexible electrode plate of the touch panel described above, a thin glass or a plastic film has been used. As the plastic film, a polyethylene telephthalate (PET) film is generally used, and a transparent electrode layer made of indium-tin oxide (ITO) is formed thereon via an undercoat layer.

Meanwhile, as the use of the touch panel expands recently, there are demands of improving the display quality such as an improvement of the display contrast and the prevention of the external light reflection. In order to meet the demands, there has been an attempt of integrating a touch panel and a liquid crystal cell. For Example, as disclosed in Jpn. Pat. Appln. KOKAI Publication Nos. 3-121523 and 10-48625, the touch panel-integrated liquid crystal display device has a structure in which a touch panel is provided between an observation side (upper side) polarizer plate and a liquid crystal cell, and the flexible electrode plate of the touch panel is fixed to the lower surface of the observation-side polarizer plate of the liquid display device.

With a touch panel-integrated liquid crystal display device of such structure, the contrast of the entire display device can be improved, and further the reflection light from the inside of the touch panel can be avoided by imparting an appropriate retardation to the plastic film which constitutes the flexible substrate of the flexible electrode plate, or attaching another retardation film thereon.

Here, it should be noted that the plastic film used as the substrate for the flexible electrode plate of the touch panel is required to have uniform optical properties since the optical properties thereof has influence on the light polarization state. Especially, such a plastic film is required to have an extremely low retardation (uniform optical isotropy) or a uniform retardation (uniform optical anisotropy). A PET film, which has conventionally been used, is a crystalline plastic material, and partially crystallizes within the film. Consequently, the molecular orientation is not uniform, and therefore the retardation is widely varied. Under these circumstances, there is an attempt of using, in place of a PET film, a film obtained by subjecting amorphous plastic such as polycarbonate or polyarylate to solution casting.

However, the inventors of the present invention have found for the first time that when conventionally used polycarbonate or polyarylate is used as the substrate for the flexible electrode plate of the touch panel, and it is fixed to the observation-side polarizer film of the liquid crystal display device, the optical properties of the film substrate greatly vary under hot and humid environments. The variation of the optical properties of the film substrate under hot and humid environments is considered to be due to the fact that the polarizer plate, which has an inferior humidity and heat resistance, deforms when the touch panel-integrated liquid crystal display device is placed under a humid and hot environment during use, resulting in that stresses are applied to the flexible film substrate fixed to the polarizer, leading to the change in the optical characteristics of the flexible film substrate. This phenomenon has been found to be due to the circumstances special to the structure of the touch panel, in which the film substrate on which the polarizer plate is fixed, is a plastic film which has a flexibility, and the plastic film is fixed only at its periphery to a rigid substrate such as glass, thus being easily deformed.

Such a variation itself in the optical properties of the film substrate, caused by the stress generated during use will be suppressed by increasing the thickness of the film substrate. However, when the film substrate is thickened, the rigidity of the film substrate increases to require an excessive amount of pressing force in order to detect an input position with the touch panel, that is, in order to deform the flexible electrode plate, to ultimately lose the flexibility of the film substrate, thereby making it impossible to detect the input position.

Further, an amorphous acryl-based plastic or amorphous olefin-based plastic itself, for example, has optical properties which vary little, and therefore it is considered to use these plastic materials as the flexible film substrate. However, it has been found that these plastic materials have a low heat resistance, and therefore they may deform at the temperature of processing the touch panel. They also have a low polarity, and thus is difficult to provide good adhesion with a transparent electrode layer or various coating layers, formed on its surface. It has also been found that it is difficult to intentionally impart a retardation thereto by use of means such as drawing.

Therefore, an object of the present invention is to provide a resistance-film type touch panel capable of substantially maintaining the initial optical properties even if the polarizer plate is deformed as the panel is placed under an environment of a high temperature and a high humidity while being used.

Further, another object of the present invention is to provide a resistance-film type touch panel which does not substantially exhibit the change in color tone even if the panel is placed under an environment of a high temperature and a high humidity while being used.

Still another object of the present invention is to provide a resistance-film type touch panel capable of preventing the reflection of external light.

Still another object of the present invention is to provide a liquid crystal display device in which a touch panel of the present invention is incorporated.

BRIEF SUMMARY OF THE INVENTION

In order to achieve the above-described objects, the inventors of the present invention conducted intensive researches and studies and have found that a film made of an amorphous plastic material having an optical elasticity coefficient in a certain range does not substantially vary its optical properties even if a stress is applied due to the deformation of the polarizer plate, caused under a high-temperature and high humidity environment, and further is capable of providing an excellent film substrate for a flexible electrode plate, to which a uniform optical anisotropy can easily be imparted when desired. The present invention is based on these findings.

Thus, the present invention provides a touch panel for use in a liquid crystal display device, comprising: a rigid electrode plate including a first substrate which is transparent and relatively rigid, and has a first main surface and a second main surface, and a first transparent electrically conductive layer provided on the second main surface of the first substrate; a flexible electrode plate including a second substrate which is transparent and flexible, and has a first main surface and a second main surface, and a second transparent electrically conductive layer provided on the first main surface of the second substrate, the flexible electrode plate arranged to be apart from a rigid electrode plate such that the second transparent conductive layer faces the first transparent conductive layer; and a polarizer plate fixed on the second main surface of the second substrate; wherein the flexible electrode has a flexibility sufficient to yield by a pressing force applied pointwise on the polarizer plate, thereby to bring the second transparent conductive layer into point contact with the first transparent conductive layer, the second substrate is made of a transparent film of a transparent amorphous plastic material having a glass transition temperature of 100° C. or higher, and the transparent film has a relative optical elasticity coefficient Cr value of 0.2 to 0.8 defined by an equation:

$$Cr=C/Cpc \quad (1)$$

where C represents an optical elasticity coefficient of the transparent film and Cpc represents an optical elasticity coefficient of a polycarbonate film derived from bisphenol A).

The present invention also provides a liquid crystal display device equipped with a touch panel of the present invention.

Further characteristics of the present invention will become apparent from the detailed descriptions provided below with reference to the accompanying drawing, and are recited in the claims attached hereto.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

The single FIGURE is a schematic cross-sectional view showing a touch panel-integrated liquid crystal display device.

DETAILED DESCRIPTION OF THE INVENTION

The present invention will now be described in detail with reference to the drawing.

The FIGURE is a cross-sectional view showing an Example of the liquid crystal display device in which a touch panel of the present invention is incorporated.

Referring to the FIGURE, a touch panel, entirely designated at 20, is fixed on a liquid crystal cell, entirely designated at 10, via a spacer 30.

A liquid crystal cell 10 itself may be the one known per se, and, as can be seen in the FIGURE, typically includes a pair of transparent electrode plates 11 and 12 arranged to be apart but face each other via a spacer 13.

The transparent electrode plate 11 includes a transparent substrate 111 made of a transparent material such as glass or transparent plastic, and a transparent electrode layer 112 provided on its upper surface. Likewise, the transparent electrode plate 12 includes a transparent substrate 121 made of a similar material to that of the transparent substrate 11, and a transparent electrode layer 122 provided on its lower surface.

Both of the transparent electrode layers 112 and 122 can be made of a transparent electrically conductive material such as ITO. For Example, the transparent electrode layer 112 and the transparent electrode layer 122 each can be constituted by a plurality of stripe electrode lines, and the electrode lines which constitute the electrode layer 112 and the electrode lines which constitute the electrode layer 122 can be arranged to intersect with each other in a matrix form.

A space between the transparent electrode plates 11 and 12 is filled with a liquid crystal material LC.

As is well-known in the art, for a color display, the liquid crystal material LC itself may have a color display property, or alternatively, it is possible to provide a color polarizer film (not shown) or provide a color filter (not shown) between the substrate 121 and the electrode layer 122.

The touch panel 20 includes a rigid (fixed) electrode plate 21 and a flexible (movable) electrode plate 22 arranged to be apart but face each other via a spacer 23. The rigid electrode plate 21 includes a first substrate 211 made of a transparent and relatively rigid material such as glass or rigid plastic, therefore which is transparent and rigid, and a transparent electrically conductive layer 212 formed on the entire second main surface thereof (which corresponds to the upper surface in the FIGURE).

On the other hand, the flexible electrode plate 22 includes a second substrate 221 which is transparent and flexible, and comprises a transparent plastic film of the present invention, which will be later described in detail, and a transparent conductive layer 222 formed on the entire first main surface thereof (which corresponds to the lower surface in the FIGURE).

On the second main surface (which corresponds to the upper surface in the FIGURE) of the second substrate 221, a polarizer plate (film) 24 is fixed. The polarizer film 24 has a flexibility, and may be the one known per se, and has a structure in which both surfaces of the polarizer layer covered by protective layers. In general, the polarizer film 24 can be obtained by attaching triacetylcellulose films on both surfaces of an iodine-impregnated polyvinyl alcohol film. The plastic material for the polarizer film 24 has a relative high moisture-absorption property and is easily deformed under high-temperature and high-humidity environments. The polarizer film 24 usually can have a thickness of 150 to 250 μm. (As can be understood from the above description, with regard to the substrate, the first main surface and the second main surface refer to both surfaces of the substrate, which extend in a direction intersecting the thickness direction of the substrate.

The flexible electrode plate 22 has a sufficient flexibility so that it yields or flexes by a pressing force applied pointwise (for example, a pressing force applied by a pen or a finger) on the polarizer plate 24 to bring the second transparent conductive layer 222 into point contact with the first transparent conductive layer 212. On the other hand, the rigid electrode plate 21 does not have a flexibility as well as that of the flexible electrode plate 22, and it exhibits such a rigidity that it does not easily yield even if the pressing force is applied thereto.

The substrate 221 of the flexible electrode plate 22 of the present invention is made of a transparent film of an amorphous plastic material having a glass transition temperature of 100° C. or higher, and the transparent film has a relative optical elasticity coefficient Cr value of 0.2 to 0.8 defined by the equation:

$$Cr=C/Cpc \tag{1}$$

where C represents an optical elasticity coefficient of the transparent film and Cpc represents an optical elasticity coefficient of a polycarbonate film derived from bisphenol A.

If the Cr value is less than 0.2, it becomes difficult to intentionally impart a retardation to the film, whereas if the Cr value exceeds 0.8, the optical properties of the film vary greatly due to the stress derived from the deformation of the polarizer plate 24, thus creating variation of the optical properties within the film surface. The variation causes nonuniformity of the display properties such as contrast and color tone when the film substrate is built in the liquid crystal display device. The transparent plastic film which constitutes the film substrate 221 of the present invention should preferably have a Cr value of 0.3 to 0.7.

The optical elasticity coefficient of the film refers to the variation rate in the retardation under stresses, and it can be determined by measuring the birefringency of the film under various loads and obtained as variation amount of the birefringency per unit weight (stress). The birefringency of the film can be measured with microscopic polarization spectrophotometer (for example, TFM-120AFT-PC of Oak Manufacturing Co. of Japan).

More specifically, a predetermined transparent film is cut in an optical axial direction into stripes each having a width of 1 cm, and one ends of the stripes are fixed, whereas the other ends (free ends) are loaded with weights of 50 g, 100 g and 150 g, respectively. The birefringency values under these weights are measured, and the variation amount (C) of the birefringency per unit weight (stress) is calculated. A similar operation is carried out on stripes (having a thickness of 60 μm) of polycarbonate (having a weight-average molecular weight (Mw)=37500±3000) derived from bisphenol A. Thus, the variation amount (Cpc) of the birefringency per unit weight (stress) is calculated. The Cr value is obtained as the ratio of the variation amount (C/Cpc) of thus obtained birefringencies.

As described above, it is necessary that the amorphous plastic material which constitutes the flexible transparent film substrate 221 should have a glass transition temperature (Tg) of 100° C. or higher, preferably 150° C. or higher, and more preferably 170° C. or higher. When the glass transition temperature is low, the deformation of the film or undesirable change in the retardation occurs during the assembly of the touch panel due to its processing temperature, and further it becomes difficult to endure the deformation of the polarizer plate under high-temperature environments.

If the plastic film is crystalline, the molecules are orientated due to the partial crystallization within the film, which may cause the variation of its optical properties, especially the retardation. In addition, the created fine crystals scatter light and thus the haze of the film is increased. For these reasons, it is necessary that the plastic material which constitutes the flexible transparent film substrate 221 should be substantially amorphous.

The amorphous plastic material having such a low Cr value and a high Tg value as above is, for example, an aromatic polycarbonate containing a bisphenol component (in more detail, having a structure unit derived from bisphenol), an aromatic polyester or an aromatic polyester carbonate, or a mixture of these, or a mixture of these materials and other polymers. An aromatic polycarbonate containing bisphenol component and aromatic polyester are more preferred.

It is particularly preferred that the bisphenol component should contain at least one bisphenol selected from the group consisting of 1,1-bis(4-hydroxyphenyl)-(alkyl-substituted or non-substituted)cycloalkane, 1,1-bis(3-substituted-4-hydroxyphenyl)-(alkyl-substituted or non-substituted)cycloalkane and 1,1-bis(3,5-disubstituted-4-hydroxyphenyl)-(alkyl-substituted or non-substituted) cycloalkane. These bisphenols will sometimes be generically referred to as specified bisphenol hereinafter.

The cycloalkane ring in each of the specified bisphenols should preferably be of a 5 to 8-membered ring, or more preferably a 5 to 6-membered ring. Further, in each of the last two specified bisphenols, the substituent on the third position, and the substituents on the third and fifth positions in the phenyl group may each be an alkyl group having 1 to 12 carbon atoms or a halogen atom.

Further, the cycloalkane ring in each of the specified bisphenol should preferably be substituted with an alkyl group in addition to the bisphenyl substituent. That is, of the specified bisphenols, 1,1-bis(4-hydroxyphenyl)-alkyl-substituted cycloalkane, 1,1-bis(3-substituted-4-hydroxyphenyl)-alkyl-substituted cycloalkane, and/or 1,1-bis(3,5-disubstituted-4-hydroxyphenyl)-alkyl-substituted cycloalkane are more preferable. It is preferable that the alkyl substituent on the cycloalkane ring should contain 1 to 6, more preferably, 1 to 4 carbon atoms, and each cycloalkane ring should contain 1 to 12, more preferably, 2 to 8 alkyl groups of such a type.

Preferable Examples of 1,1-bis(4-hydroxyphenyl)-alkyl-substituted cycloalkane are 1,1-bis(4-hydroxyphenyl)-3,3,5- trimethylcyclohexane, 1,1-bis(4-hydroxyphenyl)-3,3,5,5-tetramethylcyclohexane, 1,1-bis(4-hydroxyphenyl)-3,3,4-trimethylcyclohexane, and 1,1-bis(4-hydroxyphenyl)-3,3,5-trimethylcyclopentane. 1,1-bis(4-hydroxyphenyl)-3,3,5-trimethylcyclohexane is readily commercially available, and therefore is particularly preferable.

Preferable 1,1-bis(3-substituted-4-hydroxyphenyl)-alkyl-substituted cycloalkanes includes 1,1-bis(4-hydroxyphenyl)-alkyl-substituted cycloalkane in which the third position of each phenyl group is substituted with an alkyl group having 1–12 carbons or a halogen group. Preferable Examples thereof are 1,1-bis(3-methyl-4-hydroxyphenyl)-3,3,5-trimethylcyclohexane, 1,1-bis(3-ethyl-4-hydroxyphenyl)-3,3,5,5-tetramethylcyclohexane, 1,1-bis(3-chloro-4-hydroxyphenyl)-3,3,4-trimethylcyclohexane, and 1,1-bis(3-bromo-4-hydroxyphenyl)-3,3,5-trimethylcyclopentane.

Preferable 1,1-bis(3,5-disubstituted-4-hydroxyphenyl)-alkyl-substituted cycloalkanes includes 1,1-bis(4-hydroxyphenyl)-alkyl cycloalkane in which the third and fifth positions of each phenyl group are each substituted with a 1 to 12-carabon alkyl group or a halogen group. Preferable Examples thereof are 1,1-bis(3,5-dichloro-4-hydroxyphenyl)-3,3,5-trimethylcyclohexane, 1,1-bis(3-ethyl-5-methyl-4-hydroxyphenyl)-3,3,5-trimethylcyclohexane and 1,1-bis(3,5-dimethyl-4-hydroxyphenyl)-3,3,5-trimethylcyclohexane.

The bisphenol component contained in the aromatic polycarbonate, aromatic polyester or aromatic polyester carbonate may be comprised of at least one specified bisphenol, or may contain other bisphenol in addition to a specified bisphenol. Examples of such other bisphenol are 2,2'-(4-hydroxyphenyl)propane, 4,4'-(α-methylbenzylidene)bisphenol, bis(4-hydroxyphenyl)methane, 2,2'-bis(4-hydroxyphenyl)butane, 3,3'-bis(4-hydroxyphenyl)pentane, 4,4'-bis(4-hydroxyphenyl)heptane, 4,4'-bis(4-hydorxyphenyl)-2,5-dimethylheptane, bis(4-hydroxyphenyl)methylphenylmethane, 2,2'-bis(4-hydroxyphenyl)octane, bis(4-hydroxyphenyl)-4-fluorophenylmethane, 2,2'-bis(3-fluoro-4-hydroxyphenyl)propane, bis(3,5-dimethyl-4-hydroxyphenyl)methane, 2,2'-bis(3,5-dimethyl-4-hydroxyphenyl)propane, bis(3,5-diethyl-4-hydroxyphenyl)phenylethane, bis(3,5-dimethyl-4-hydroxyphenyl)sulfone and a mixture of these.

Examples of other bisphenols which can be used in combination with the specified bisphenols are bis(4-hydroxyphenyl)diphenylmethane, 9,9-bis(4-hydroxyphenyl)fluorene, 3,3'-bis(4-hydroxyphenyl)pentane, 4,4'-bis(4-hydroxyphenyl)heptane, 4,4'-bis(4-hydroxyphenyl)-2,5-dimethylheptane, and a mixture of these.

It is preferable that the bisphenol component which produces the above aromatic polycarbonate, aromatic polyester or aromatic polyester carbonate should contain a specified bisphenol in an amount of 30 to 100 mol %, and more preferably 50 mol % to 100 mol %.

The aromatic polycarbonate used in the present invention can be prepared by methods known per se in the art, such as the interfacial polymerization method, pyridine method, and interesterification method. The aromatic polyester used in the present invention can be prepared by methods known per se from the above bisphenol component and an acid component. Preferable Examples of the acid component which constitutes the aromatic polyester together with the bisphenol component are aromatic dicarboxylic acids such as telephthalic acid, isophthalic acid and a mixture of these. Preferable combination of these compounds can be determined by the values of the optical elasticity coefficient and the glass transition temperature of the plastic obtained.

The aromatic polycarbonate of the present invention is more preferably a polycarbonate which contains, as the bisphenol component, 1,1-bis(4-hydroxyphenyl)-3,3,5-trimethylcyclohexane in an amount of 30 mol % or more. The aromatic polyester is more preferably a polyester which contains, as the bisphenol component, 1,1-bis(4-hydroxyphenyl)-3,3,5-trimethylcyclohexane in an amount of 90 mol % or more, and as an acid component, telephthalic acid and/or isophthalic acid.

The aromatic polyester, polycarbonate, polyester carbonate can be prepared by the methods well known per se in the art, as described above, and these methods are discussed in detail in, for example, Jpn. Pat. Appln. KOKAI Publication No. 2-88634 and KOKAI Publication No. 3-91526.

In order to adjust the Cr value of the transparent film, mixtures of the aromatic polyesters, mixtures of the aromatic polycarbonates, or mixtures of the aromatic polyesters with the aromatic polycarbonates can be used. Further, the aromatic polyesters, or the aromatic polycarbonates may be blended with an ordinary polycarbonate (such as bisphenol A polycarbonate) or polyester.

The flexible transparent film of the present invention may contain a small amount of additive if necessary. Examples of such an additive are dimethyl phthalate, diethyl phthalate, di-n-butyl phthalate, di-n-octyl phthalate, di-n-ethylhexyl phthalate, diisooctyl phthalate, di-n-octyl phthalate, di-n-decyl phthalate, diisodecyl phthalate, di-n-dodecyl phthalate, diisotridecyl phthalate, dicyclohexyl phthalate, butyl benzyl phthalate, di-2-ethylhexyl phthalate, di-n-decyl adipate, diisodecyl adipate, di-2-ethylhexyl adipate, di-2-ethylhexyl azelate, dibutyl sebacate, di-2-ethylhexyl sebacate, tributyl phosphate, tri-2-ethylhexyl phosphate, 2-ethylhexyl phosphate, tricresyl phosphate, epoxidized soybean oil, epoxidized tall oil fatty acid-2-ethylhexyl ester, butyl stearate, butyl oleate, chlorinated paraffin, and chlorinated fatty acid methyl ester, and as polymeric additives are polyethyleneglycol dimethyl ether, polyethyleneglycol benzoic ester and a polymeric compound containing an ester group (for example, a polycondensate of dibasic acid, such as adipic acid, sebacic acid or phthalic acid, with a glycol such as 1,2-propylene glycol or 1,3-propylene glycol). These additives serve as a plasticizer, and further serves to suppress the variation of the retardation when imparting the retardation by rolling the transparent film of the present invention. These additives may be added solely or in combination of two or more, in an amount of 2 to 20 parts by weight with respect to 100 parts by weight of the aromatic polyester or aromatic polycarbonate.

In order to obtain the flexible transparent film of the present invention, the amorphous plastic material is formed into a film. For forming the film, various known methods such as melt extrusion method, inflation method, and solution casting method, with the solution casting method being particularly preferred. With the solution casting method, an optically isotropic film which is free of defects such as die lines, and has a high film thickness accuracy and a small retardation value, can be obtained. It suffices if the thickness of the flexible transparent film of the present invention is such a thickness that will not raise a problem in inputting when it is built in a touch panel. The thickness of the flexible transparent film is generally 30 µm to 150 µm, and preferably, 50 to 100 µm.

Further, if necessary, the optically isotropic film obtained as above may be subjected to an orientation process by a conventionally known orientation method, so as to impart a uniform retardation thereto. By means of uniaxial or biaxial orientation, polymers can be orientated within the film surface. Alternatively, a special orientation such as disclosed in KOKAI Publication No. 5-157911 may be carried out so as to control the refractivity of the film in terms of three-dimension, thus decreasing the view angle dependency of the display. By these orientation process, it is possible to impart an anti-reflection function and color-compensation function when combined with a super-twisted nematic (STN) liquid crystal cell. An appropriate retardation value is generally 30 nm to 2000 nm; however a preferable value depends upon the function which is targeted, and the optimal retardation value should be selected. In order to impart the anti-reflection function, it is desirable that the retardation value should be selected from a range of 50 nm to 250 nm. Further, in order to impart the color compensation function for the case where it is combined with the STN liquid crystal cell, it is desirable that the retardation value should be selected from a range of 400 nm to 600 nm.

The surface of the transparent film of the present invention may be subjected to a corona treatment, if necessary. In particular, when the surface of the film is subjected to a surface treatment such as a coating treatment or a separate film is laminated thereon with an adhesive, the corona treatment carried out on the film surface is an appropriate method as means for increasing the mutual adhesion.

Further, one or both surfaces of the transparent film of the present invention may be provided with a surface coating layer in order to, for example, impart a solvent resistance property to the film, or improving the adhesion with respect to a transparent electrically conductive layer. The coating layer may be made of an organic material, an inorganic material, or an organic-inorganic composite material, in accordance with its object.

Preferable Examples of the organic coating material are melamine resin, acryl resin, urethane resin, alkyd resin and fluorine-containing resin. Preferable Examples of the organic-silicone composite material are those obtained by blending polyesterpolyol or etherified methylol melamine with partial hydrolyzate of alkyltrialkoxysilane or tetralkoxysilane. Further, silicone-based materials such as partial hydrolyzate of aminosilane or epoxysilane, those obtained by blending partial hydrolyzate of alkyltrialkoxysilane or tetralkoxysilane with a silane coupling agent, and those obtained by blending partial hydrolyzate of alkyltrialkoxysilane with colloidal silica can be appropriately used. These materials can be applied on one or both surfaces of the transparent film of the present invention by coating, and then subjected to thermosetting, thereby obtaining a film having a solvent resistance coating. In this case, the use of a low-temperature thermosetting catalyst at the same time is preferable in order to suppress the thermal instability of the film, which is not desirable. Further, a hardening layer obtained by adding a photo-initiator to a monomer or oligomer such as polyfunctional acrylate and then exposing it to ultraviolet ray or electron beam can be appropriately used. In the coating layer, a filler may be added when necessary. With addition of the filler, it is possible to suppress the generation of the Newton ring, which is not desirable, caused by the interference of light between transparent conductive layers in the touch panel, or the blocking of the electrode plates with each other. Preferable Examples of the filler are organic fillers composed of polymethacrylic acid ester, polyacrylic acid ester, polyolefin, polystyene, divinylbenzene, benzoguanamine and organic silicone, and inorganic fillers composed of silica, alumina and titanium oxide.

Inorganic materials composed of metal oxides and metal nitrides including silicon oxide and silicon nitride can be used as a preferable coating layer. These ceramic coating layers can be obtained by applying a reactive inorganic coating agent, and then hardening it. A preferable Example of the reactive inorganic coating agent is a polysilazane-based inorganic polymer. The inorganic polymer can be obtained by the method disclosed in, for example, Jpn. Pat. Appln. KOKAI Publication No. 1-203476. Further, as discussed in Jpn. Pat. Appln. KOKAI Publication No. 6-240208 and KIKAI Publication No. 6-122852, the modified polysilazane obtained by partially modifying a polysilazane-based polymer with a compound having an active hydrogen such as alcohol can be used appropriately. The polysilazane-based inorganic polymer layer formed on the surface of the film gives rise to a rigid and solvent resistance inorganic thin film as it is hardened by heat. More specifically, the polysilazane-based polymer gives rise to a silicon nitride-like thin film, as it is sintered by heat under a chemically inert atmosphere such as nitrogen or argon. Alternatively, as it is sintered in the presence of oxygen or steam, it gives rise to a silicon oxide-like thin film.

Further, if necessary, a layer having a gas barrier property may be formed on the transparent film of the present invention. In particular, when a layer having a humidity barrier property is formed on the film, it becomes possible to prevent dew formation between the flexible electrode plate and the rigid electrode plate in a touch panel, which is preferable. When dew is formed, both transparent electrodes are connected by the dew portion, which may cause the malfunction of the touch panel.

The gas barrier layer can be formed of an organic or inorganic material. Examples of the material for the organic gas barrier layer are organic polymeric materials including acrylonitrile-based polymers such as poyacrylonitrile, acrylonitrile-methyl acrylate copolymer and acrylonitrile-styrene copolymer, polyvinilidene chloride, and vinylalcohol-based polymers such as polyvinylalcohol and vinylalcohol-ethylene copolymer. These organic polymeric materials can be applied on the transparent film of the present invention by a wet-coating method using a gravure coater or reverse coater.

Examples of the material for the inorganic gas barrier layer are silicon dioxide; a compound containing, as a main component, silicon dioxide and one or more other metal oxides such as silicon monoxide or aluminum oxide; silicon nitride; or a compound containing, as a main component, silicon nitride and one or more other metal nitrides such as aluminum nitride; more specifically, $SiO_x$ and SiAlN. Of the silicon oxide-based metal oxide and silicon nitride-based metal nitride, $SiO_x$, especially, $SiO_x$, particularly the one having an x value of 1.3 to 1.8, preferably, 1.5, is preferable. The inorganic barrier layer can be formed by the physical vapor deposition method (PVD) such as spattering or electron beam deposition method, or the chemical vapor deposition method (CVD). Further, it can be formed by forming an organometallic compound layer such as polysilazane on the film of the present invention, followed by thermal decomposition.

The barrier layer may be used solely, or a plurality of them may be co-used. In particular, a combination of an organic barrier layer and an inorganic barrier layer is especially preferable since it will have an excellent resistance property of the organic layer to the generation of cracks or pinholes of the barrier layer, and an excellent resistance property of the inorganic layer to steam. In this case, it is possible to form an anchor coating layer between these layers in order to enhance the adhesion between the layers. As the anchor coating layer, a layer of hardened material of a polysiloxane such as polydimethylsiloxane, or a layer of hardened material of urethane resin or epoxy resin is appropriately used. The anchor coating layer can be hardened by applying heat, ultraviolet ray and/or electron beam to the resin coating.

It is not required that the transparent film of the present invention should have all of these coating layers, and the types and composition thereof are appropriately selected in accordance with the object.

The transparent conductive layers 212 and 222 each should preferably be made of indium oxide-based metal oxide. The indium oxide-based metal oxide includes indium oxide and a compound containing indium oxide as a main component, specifically, in an amount of 80% by weight or more, or further 90 to 95% by weight, and one or more other metal oxide such as tin oxide or cadmium oxide in an amount of 20% by weight or less, or further 5 to 10% by weight. More specifically, ITO and $CdIn_2O_4$ can be exemplified Of the indium oxide-based metal oxides, ITO, especially, ITO containing tin in an amount of 10% by weight or less in terms of metal, preferably, 5 to 10% by weight, is preferable since it can achieve a high transparency.

As can be understood from the above description, the transparent conductive layer 222 may be formed directly on the transparent film of the present invention, or on the gas barrier layer or the solvent resistance coating layer. Further, the transparent conductive layers 212 and 222 may be formed on the substrate via an intermediate layer in order to improve the adhesion with the substrates 211 and 221.

These transparent conductive layers 212 and 222 can be formed with use of film forming techniques such as DC magnetron spattering, electron beam deposition and CVD. Of these film forming techniques, the DC magnetron spattering is particularly preferable because of its resistance stability and adhesion to a transparent film. A preferable resistance value f the transparent conductive layer is 100 $\Omega/\square$ to 1000 $\Omega/\square$, and more preferably, 200 $\Omega/\square$ to 600 $\Omega/\square$. Further, it is preferable that the transparent conductive layer should have a light transmittance of 85% or higher.

It should be noted that coating layers for imparting various functions such as the solvent resistance property, gas barrier property and transparent electric conductivity may be formed directly on the transparent film of the present invention; however it is also possible that other transparent film having these functions are laminated directly or via an adhesive on the transparent film of the present invention.

The flexible electrode plate 22 thus obtained, if having a large thickness, requires a high pressing force for inputting, easily causing an input error. Therefore, a large thickness is not preferable. The thickness of the flexible electrode plate 22 is generally 30 to 150 $\mu$m, and more preferably 50 to 100 $\mu$m. It is further preferable that the flexible electrode plate 22 should have a light transmittance of 85% or more and a haze of 2% or less. Further, depending on the surface property of the transparent film or the coating layer, undesirable dazzling may occur in some cases on a displayed image when the electrode plate is combined with the liquid crystal cell. This dazzling can be prevented with use of a flexible electrode plate having a transmitting image visibility of 80% or more preferably 85% or more when measured using a slit of 0.25 mm, although it depends on the resolution of the display image.

When it is applied to a touch panel, the transparent film of the present invention will exhibit a small variation in its optical properties even if non-uniform stress is applied by the deformation of the polarizer plate caused by a change in environment, thereby making it possible to maintain a stable display quality.

The present invention will now be described with reference to Examples.

First, the measuring methods for physical properties presented in the following Examples and comparative Examples will now be described.

<Method of Measuring Cr Value>

A film is cut, in an optical axis direction, into stripes each having a width of 1 cm, which are fixed at their one ends, loaded with weights of 50 g, 10 g and 150 g, respectively at the other ends. The birefringencies of these films under the respective weights are measured, and the variation amount (the C value in the equation (1)) in the birefringency per unit weight (stress) is calculated. A similar operation is carried out on a polycarbonate film stripe derived from bisphenol A (Mw=37500±3000, a thickness of 60 $\mu$m) so as to calculate the variation amount (the Cpc value in the equation (1)) of the polycarbonate film in the birefringency per unit weight (stress). The Cr value can be calculated from C/Cpc. The birefringency of the film can be measured with microscopic polarization spectrophotometer (for example, TFM-120AFT-PC of Oak Manufacturing Co. of Japan).

<Method of Measuring Transmitting Image Visibility>

It is measured by the method described in JIS K7105-1981, 6.6.

<Method of Measuring Light Transmittance>

It is measured by the method described in ASTEM E275-67 using light of 550 nm.

<Method of Measuring Haze>

It is measured by the method described in JIS K7105-1981, 6.4.

EXAMPLE 1

In this Example, a polycarbonate produced from 1,1-bis (4-hydroxyphenyl)-3,3,5-trimethylcyclohexane and bisphenol A (molar ratio of 7:3) using phosgene was used. The molecular weight of the polycarbonate was 0.85 (32° C., 0.32 g/dl chloroform) in terms of $\eta SP/C$ value, and its glass transition temperature was 206° C. (DSC).

This polycarbonate was dissolved in methylene chloride to have a concentration of 15% by weight, and the solution was cast onto an SUS plate. The solution was then allowed to stand for 60 minutes at room temperature to form a film, and the obtained film was peeled. The film was clipped with a 4-side fixation jig, and dried at 140° C. for 10 minutes and then 260° C. for 10 minutes, and thus a desired transparent film having a thickness of about 80 $\mu$m was obtained. The Cr value of the transparent film was 0.65.

On both surfaces of the transparent film, an epoxy acrylate-based ultraviolet ray setting type coating solution in which a divinylbenzene-based filler having an average particle diameter of 2 $\mu$m was dispersed was applied and hardened, thus forming a hard coating layer having a thickness of about 2 $\mu$m. Further, on one of the surfaces, an ITO was applied by a spattering method, and thus a desired flexible electrode plate was obtained. The surface resistance of the transparent conductive layer was 400 $\Omega/\square$. The transmitting image visibility of the flexible electrode plate, measured with use of a slit having a width of 0.25 mm, was 85%, the light transmittance measured using light having 550 nm was 87%, and the haze was 0.8%.

On the other hand, ITO was applied on a glass plate to prepare a rigid electrode plate, and dot spacers each having a dot diameter of 5 $\mu$m were printed on an entire ITO surface at intervals of 5 mm. Then, this rigid electrode plate and the flexible electrode plate were arranged such that the ITO layers face each other, and the four sides were sealed, thus providing a touch panel structure having a plane size of 12 cm×16 cm. Further, a polarizer film having a thickness of 220 µm was adhered on the upper surface of the flexible electrode plate, and thus a desired touch panel was obtained.

This touch panel was placed in a hot and wet atmosphere having a temperature of 60° C. and a relative humidity of 90% for 250 hours (a wet heat test), and the variation in the optical properties was measured. The retardation value was measured every 4 cm-distance at 12 sites. The variation of the retardation within the surface, represented by the difference between the maximum and minimum values, was initially 4 nm, but after the wet heat test, it was 8 nm. Further, a separate polarizer plate was placed underneath the touch panel such that the absorption axis thereof crosses normal to the upper side polarizer plate. Then, the color tone within the surface was observed by eyes, and there was no significant change observed before and after the wet heat test.

EXAMPLE 2

A film obtained in Example 1 was subjected to a vertical uniaxial orientation and thus a retardation film having a retardation value of 142 nm (measurement wavelength of 550 nm) was obtained. Then, in a similar manner to that of Example 1, a flexible electrode plate having a transmitting image visibility of 85%, a light transmittance, measured using light having 550 nm, of 87%, and a haze of 0.8% was obtained.

A touch panel structure was assembled in a similar manner to that of Example 1 except for the use of the above obtained flexible electrode plate. Thereafter, a polarizer plate having a thickness of 220 µm was adhered on the retardation film such that the optical axis of the retardation film and the absorption axis of the polarizer plate cross at an angle of 45°, thus obtaining a desired touch panel. The touch panel was subjected to a wet heat test in a similar manner to that of Example 1 and then the optical properties were measured. The variation of the retardation within the surface was initially 5 nm, but after the wet heat test, it became 9 nm. Then, the color tone within the surface was observed by eyes, and there was no significant change observed before and after the wet heat test.

EXAMPLE 3

A touch panel was manufactured in a similar manner to that of Example 1 except that polyarylate (glass transition temperature: 270° C., Cr value: 0.65) produced by using 1,1-bis(4-hydroxyphenyl)-3,3,5-trimethylcyclohexane as a bisphenol component, and an equimolar mixture of isophthalic acid and telephthalic acid as acid component (a molar ration of bisphenol component/acid component of approximately 1:1) was used in place of the transparent polycarbonate film. The touch panel was subjected to a wet heat test in a similar manner to that of Example 1 and then the optical properties were measured. The variation of the retardation within the surface was initially 5 nm, but after the wet heat test, it became 11 nm. Then, the color tone within the surface was observed by eyes, and there was no significant change observed before and after the wet heat test.

EXAMPLE 4

In this Example, a polycarbonate produced from 1,1-bis (4-hydroxyphenyl)-3,3,5-trimethylcyclohexane and bisphenol A (molar ratio of 1:1) using phosgene was used. The molecular weight of the polycarbonate was 0.85 (32° C., 0.32 g/dl chloroform) in terms of ηSP/C value, and the glass transition temperature was 184° C. (DSC).

This polycarbonate was dissolved in methylene chloride to have a concentration of 15% by weight, and the solution was solution cast onto an SUS plate. The solution was then allowed to stand for 60 minutes at room temperature to form a film, and the obtained film was peeled. The film was clipped with a 4-side fixation jig, and dried at 100° C. for 10 minutes and then 140° C. for 10 minutes, and thus a desired transparent film having a thickness of about 75 µm was obtained. The Cr value of the transparent film was 0.67.

The film was subjected to a free end uniaxial orientation to obtain a retardation film having a retardation value of 430 nm. Then, a desired flexible electrode plate was obtained in a similar manner to that of Example 1 except that a urethane-based undercoating agent was applied before applying the epoxy acrylate-based ultraviolet ray setting type coating solution to the retardation film, and then hardened. The transmitting image visibility of the flexible electrode plate was 85%, the light transmittance measured using light having 550 nm was 86%, and the haze was 0.9%.

Then, a touch panel was fabricated in a similar manner to that of Example 2 using this flexible electrode substrate. This touch panel was subjected to the wet heat test in a similar manner to that of Example 1, and the variation in the optical properties was measured. The variation of the retardation within the surface was initially 4 nm, but after the wet heat test, it became 10 nm. Further, a separate polarizer plate was placed underneath the touch panel such that the absorption axis thereof crosses normal to the upper side polarizer plate. Then, the color tone within the surface was observed by eyes, and there was no significant change observed before and after the wet heat test.

EXAMPLE 5

A mixture of the aromatic polycarbonate used in Example 1 and the aromatic polyester used in Example 3 at a weight ratio of 1:1 was dissolved in methylene chloride to have a concentration of 15% by weight, and the solution was subjected to flow drawing on an SUS plate. The solution was then allowed to stand for 60 minutes at room temperature to form a film, and the obtained film was peeled. The film was clipped with a 4-side fixation jig, and dried at 100° C. for 10 minutes and then 140° C. for 10 minutes, and thus a desired transparent film having a thickness of about 75 µm was obtained. The Cr value of the transparent film was 0.67. The film was subjected to a free end uniaxial orientation to obtain a retardation film having a retardation value of 430 nm.

On both surfaces of the transparent film, an epoxy acrylate-based ultraviolet ray setting type coating solution was applied via a urethane-based undercoating agent and hardened. Further, on one of the surfaces, an ITO was formed by a spattering method, and thus a desired flexible electrode plate was obtained. The surface resistance of the transparent conductive layer was 400 Ω/□. The transmitting image visibility of the flexible electrode plate was 85%, the light transmittance measured using light having 550 nm was 86%, and the haze was 0.8%.

Then, a touch panel was fabricated in a similar manner to that of Example 2 using the obtained flexible electrode substrate. This touch panel was subjected to the wet heat test in a similar manner to that of Example 1, and the variation in the optical properties was measured. The variation of the retardation within the surface was initially 5 nm, but after the wet heat test, it became 11 nm. Further, a separate polarizer plate was placed underneath the touch panel such that the absorption axis thereof crosses normal to the upper side polarizer plate. Then, the color tone within the surface was observed by eyes, and there was no significant change admitted between before and after the wet heat test.

COMPARATIVE EXAMPLE 1

A touch panel was fabricated in a similar manner to that of Example 1 except that a polycarbonate produced from bisphenol A using phosgene (glass transition temperature: 149° C., the Cr value: 1.0) was used. This touch panel was subjected to the wet heat test in a similar manner to that of Example 1, and the variation in the optical properties was measured. The variation of the retardation within the surface was initially 5 nm, but after the wet heat test, it became as high as 25 nm. Then, the color tone within the surface was observed by eyes, and there was a change in color tone observed at its peripheral section.

COMPARATIVE EXAMPLE 2

A touch panel was fabricated in a similar manner to that of Example 1 except that a polyarylate film having a thickness of 75 μm (F-1100: product of Kanegafuchi Chemical Industries Co, Inc) (Cr=1.65). This touch panel was subjected to the wet heat test in a similar manner to that of Example 1, and the variation in the optical properties was measured. The variation of the retardation within the surface was initially 6 nm, but after the wet heat test, it became as high as 33 nm. Then, the color tone within the surface was observed by eyes, and there was a significant change in color tone admitted at its peripheral section.

As described above, with use of the transparent film of the present invention, it is possible to obtain a touch panel which does not exhibit a significant change in the optical properties, especially, the retardation value, and accordingly does not exhibit a significant change in tone color, even if it is used under severe environments (especially, high temperature and high humidity environments). This touch panel exhibits an excellent effect in terms of the external light anti-reflection property as well.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A touch panel comprising:
   a rigid electrode plate including a first substrate which is transparent and rigid, and has a first main surface and a second main surface, and a first transparent electrically conductive layer provided on the second main surface of the first substrate;
   a flexible electrode plate including a second substrate which is transparent and flexible, and has a first main surface and a second main surface, and a second transparent electrically conductive layer provided on the first main surface of the second substrate, said flexible electrode plate being arranged spaced apart from the rigid electrode plate such that the second transparent conductive layer faces the first transparent conductive layer; and
   a polarizer plate fixed on the second main surface of the second substrate;
   wherein said flexible electrode has a flexibility sufficient to yield by a pressing force applied pointwise on the polarizer plate to bring the second transparent conductive layer into point contact with the first transparent conductive layer;
   the second substrate is made of a transparent film of a transparent amorphous plastic material having a glass transition temperature of 100° C. or higher, and
   the transparent film has a relative optical elasticity coefficient Cr value of 0.2 to 0.8 defined by an equation:

$$Cr = C/Cpc \qquad (1)$$

where C represents an optical elasticity coefficient of the transparent film and Cpc represents an optical elasticity coefficient of a polycarbonate film derived from bisphenol A.

2. The touch panel according to claim 1, wherein said transparent film is constituted as a retardation film.

3. The touch panel according to claim 2, wherein said transparent film has a retardation value of 50 nm to 250 nm.

4. The touch panel according to claim 1, wherein said amorphous plastic is an aromatic polyester containing a structural unit derived from at least one bisphenol selected from the group consisting of 1,1-bis(4-hydroxyphenyl)-(alkyl-substituted)cycloalkane, 1,1-bis(3-substituted-4-hydroxyphenyl)-(alkyl-substituted)cycloalkane and 1,1-bis(3,5-disubstituted-4-hydroxyphenyl)-(alkyl-substituted)cycloalkane.

5. The touch panel according to claim 4, wherein said transparent film is constituted as a retardation film.

6. The touch-panel according to claim 5, wherein said transparent film has a retardation value of 50 nm to 250 nm.

7. The touch panel according to claim 1, wherein said amorphous plastic is a polycarbonate containing a structural unit derived from at least one bisphenol selected from the group consisting of 1,1-bis(4-hydroxyphenyl)-(alkyl-substituted)cycloalkane, 1,1-bis(3-substituted-4-hydroxyphenyl)-(alkyl-substituted)cycloalkane and 1,1-bis(3,5-disubstituted-4-hydroxyphenyl)-(alkyl-substituted)cycloalkane.

8. The touch panel according to claim 7, wherein said transparent film is constituted as a retardation film.

9. The touch panel according to claim 8, wherein said transparent film has a retardation value of 50 nm to 250 nm.

10. The touch panel according to claim 1, wherein said amorphous plastic comprises a mixture of an aromatic polyester containing a structural unit derived from at least one bisphenol selected from the group consisting of 1,1-bis(4-hydroxyphenyl)-(alkyl-substituted)cycloalkane, 1,1-bis(3-substituted-4-hydroxyphenyl)-(alkyl-substituted)cycloalkane and 1,1-bis(3,5-disubstituted-4-hydroxyphenyl)-(alkyl-substituted)cycloalkane, and an aromatic polycarbonate containing a structural unit derived from said at least one bisphenol.

11. The touch panel according to claim 10, wherein said transparent film is constituted as a retardation film.

12. The touch panel according to claim 11, wherein said transparent film has a retardation value of 50 nm to 250 nm.

13. A liquid crystal display device comprising a liquid crystal cell and a touch panel fixed on the liquid crystal cell at a distance, wherein said touch panel is a touch panel according to claim 1.

* * * * *

UNITED STATES PATENT AND TRADEMARK OFFICE
CERTIFICATE OF CORRECTION

PATENT NO.    : 6,549,195 B2
DATED         : April 15, 2003
INVENTOR(S)   : T. Hikida et al.

It is certified that error appears in the above-identified patent and that said Letters Patent is hereby corrected as shown below:

<u>Title page,</u>
Item [75], Inventors, "Settsu" should read -- Osaka --

<u>Column 16,</u>
Line 34, "touch-panel" should read -- touch panel --

Signed and Sealed this

Fourteenth Day of October, 2003

JAMES E. ROGAN
*Director of the United States Patent and Trademark Office*